United States Patent [19]
Grinblat

[11] Patent Number: 5,652,676
[45] Date of Patent: Jul. 29, 1997

[54] MICROSCOPE-TELEVISION CAMERA ADAPTER

[76] Inventor: Avi Grinblat, 25 Central Park W.-Apt. 4V, New York, N.Y. 10023

[21] Appl. No.: 426,958

[22] Filed: Apr. 24, 1995

[51] Int. Cl.⁶ .................... G03B 17/48; G02B 21/36
[52] U.S. Cl. .................... 359/363; 359/872; 359/226
[58] Field of Search ............................ 359/363, 369, 359/429, 875, 872, 399, 400, 368, 226; 348/75

[56] References Cited

U.S. PATENT DOCUMENTS

| | | | |
|---|---|---|---|
| 3,490,347 | 1/1970 | Seedhouse | 359/363 |
| 5,006,872 | 4/1991 | Parker | 359/363 |
| 5,134,515 | 7/1992 | Paritz et al. | 359/363 |
| 5,315,344 | 5/1994 | Clark et al. | 359/363 |
| 5,497,267 | 3/1996 | Ishikawa et al. | 359/363 |

Primary Examiner—Timothy P. Callahan
Assistant Examiner—Eunja Shin
Attorney, Agent, or Firm—Eliot S. Gerber

[57] ABSTRACT

An adapter connects a small solid-state television camera to a viewing port of a microscope. The adapter has a lens to focus the image from the microscope, the lens being mounted in a slidable lens holder. The lens holder is slid by rotation of a manual control knob which is connected to a pinion gear in mesh with a gear rack on the lens holder. A mirror within the housing of the adapter, in its normal position, reflects the image 45 degrees and is a flat disk-shaped mirror mounted for universal movement about its center. The angle of the mirror is controlled by a finger-operated control rod which is connected to the mirror by a linkage system having a larger ball, a smaller ball mounted in a bore of the larger ball, and two pairs of rotatable mounts.

21 Claims, 2 Drawing Sheets

MICROSCOPE-TELEVISION CAMERA ADAPTER

BACKGROUND OF THE INVENTION

1. Field of the Invention

The present invention relates to adapters to connect a television camera to a microscope and more particularly to such an adapter for connecting a surgical microscope to a television camera.

2. Related Art

At the present time a number of adapters are commercially available to connect a television camera to a microscope. Generally the television camera is small and uses a solid-state electronic imaging device, such as a CCD (Charge Coupled Device). The microscope may be a stereo bright field microscope. Such adapters are available from leading scientific and surgical microscope manufacturers including Nikon, Leica-Wild and Zeiss.

When surgical stereomicroscopes are used for certain types of surgery, such as surgery on the ear, nose, throat, brain, spinal cord and eye (especially retina surgery) and other types of microsurgery, it is important that the exact location of interest be centered in the field of view of the image plane of the television camera and that the TV image be in focus. The TV image is displayed on a monitor and may be viewed by the operating surgeon, other members of the surgical team and students.

For example, if the point of surgical interest is a portion of a patient's retina and it is off-center or out of focus, or even so far off-center to be off the monitor's screen, the displayed image may be confusing or misleading. In many critical surgical operations it is important that the image on the monitor screen is on-center and in-focus.

U.S. Pat. No. 5,052,789 shows a television camera connected to a stereoscopic microscope. The optical path to the camera includes a pair of prisms and focusing lenses. However, there is no disclosure of a centering mechanism or how the focusing lenses are controlled.

U.S. Pat. No. 5,002,376 at FIG. 2 shows a surgical stereomicroscope having a zoom tube for a camera 70. U.S. Pat. No. 4,277,130 discloses a zoom lens system for a camera in a stereomicroscope.

SUMMARY OF THE INVENTION

In accordance with the present invention there is provided an adapter for a microscope, especially a surgical stereomicroscope, which connects a television camera to the microscope. The adapter has (i) an independent means for the user to focus the image on the camera's imaging device; (ii) an independent multidirectional (x and y axii) orientation means for the user to center the image at the center of the camera's imaging device; (iii) an automatic means to return the orientation means to its center when it is released; and (iv) an independent aperture to control brightness.

The adapter has a first manual control system which, preferably by rotation of a knob, will adjust the focus of the camera. The adapter has a second manual control system, preferably using a control rod, which permits the image from the microscope to be oriented in all directions (along x axis, y axis or any combination) relative to the image plane (imaging device) of the camera, so that the point of interest in the viewed object may be centered on the camera image plane.

The first manual control system, for focusing, preferably consists of a manually operated knob which is fixedly connected to a shaft having a pinion gear fixed thereon. The pinion gear meshes with a geared rack to form a rack and pinion mechanism.

A focusing lens system comprises a compound lens, which is a convex-convex objective lens. The lens is fixedly mounted in a tubular lens holder having a gear rack. Movement of the pinion gear brings lens closer, or further away, relative to the microscope viewing port. The focusing lens system is mounted in a tubular arm of a housing. The focusing lens system is mounted so that the image from the object being viewed, as magnified by the microscope, passes therethrough.

The second manual control system is mounted, for orientation, on the housing and includes a flat disk-like mirror mounted, in its normal position, to reflect the image at 45 degrees from the focusing lens system to the television camera image plane. This manual control system has a control rod which is turnable in all directions, like a "joystick" and which has sufficient frictional resistance, so that after being manipulated, it will stay in its selected position. It is automatically returned to its center position by tightening a ring nut. The control rod, at its inner end (proximal end) is fixed within the bore of a ball. The ball is held within a ball cage. The ball's bore has an indented ball seat containing a small ball which is formed at the proximal end of an extension rod. In their normal position the imaginary axis of the control rod and extension rod are aligned. The outer (distal) end of the extension rod is fixed to a bracket upon which the mirror is mounted. The mirror may be turned about its center point at any angle, i.e., turned about two perpendicular axii through its center point, by manipulation of the control rod. Such manipulation of the mirror changes the center of the received image relative to the image plane of the television camera, permitting the point of interest on the viewed object to be centered at the vertical and horizontal center of the image plane and consequently its image to be centered at the vertical and horizontal center of the monitor's screen.

DETAILED DESCRIPTION OF THE INVENTION

Figure 1:
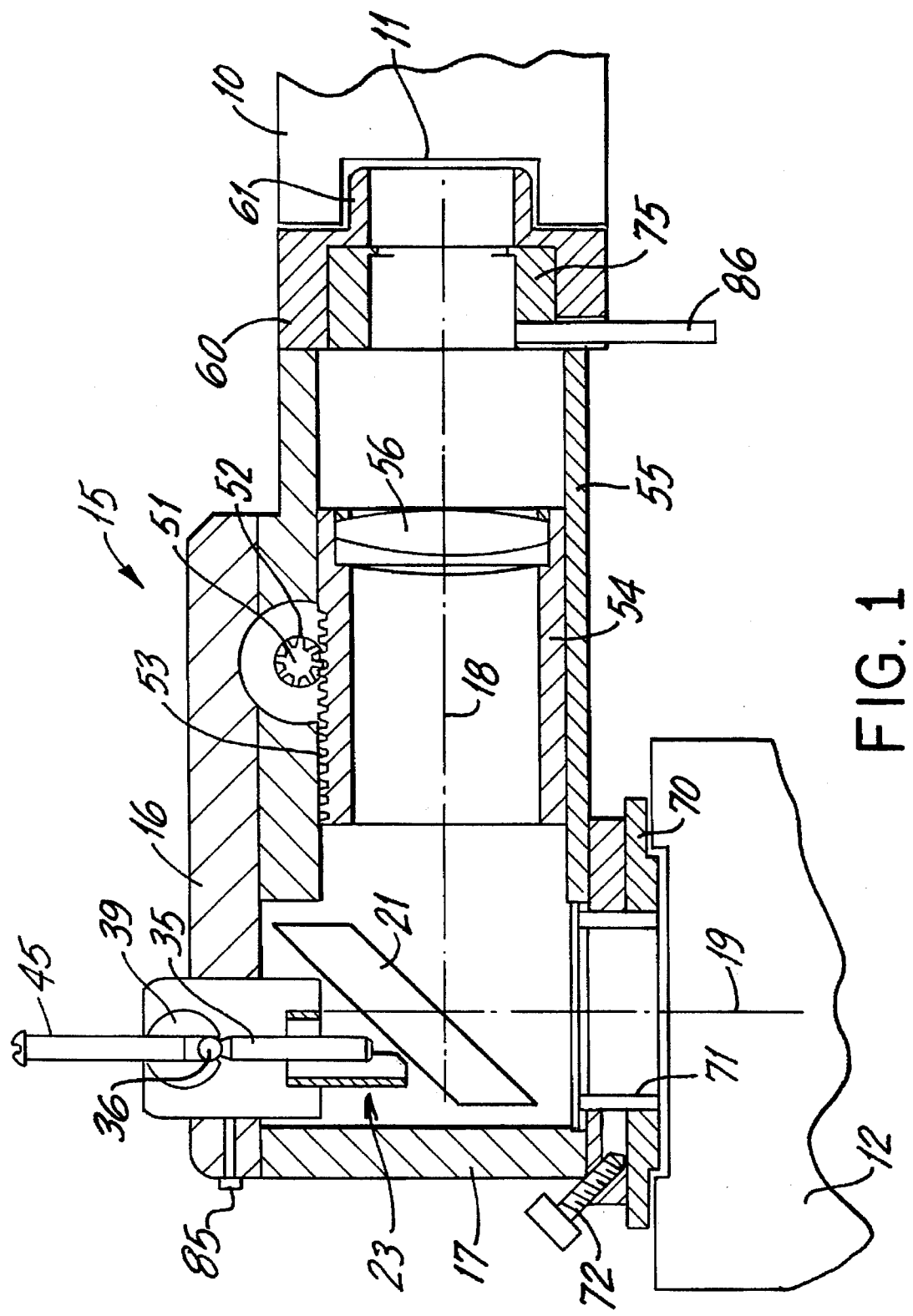
FIGS. 1 and 2 are side cross-sectional views of the adapter of the present invention.

As shown in FIG. 1 a stereomicroscope 10 has a viewing port (orifice) 11 with suitable optics to permit the same image of the object being viewed to be imaged by a television camera 12. For example, the leading microscope manufacturers, such as Nikon, Canon, Zeiss and Leica-Wild sell microscopes with such a viewing port. A suitable television camera 12 is preferably a lightweight solid-state camera using a CCD (Charge Coupled Device) pick-up imaging device at its image plane. Suitable cameras include the SONY (TM) Model Nos. TC 003, TC 999, DTC 760, DTC 960, DTC 107, DTC 101 and cameras from JVC, Panasonic, Toshiba and Ikegami. The adapter is suitable for most types of cameras used in medical and industrial applications.

The adapter 15 of the present invention fits between the microscope 10 and the camera 12. The adapter 15 has a housing 16, preferably of machined metal, having an arm 16 which is tubular (ring-like in cross-section). The arm 16 and the housing portion 17 each have imaginary central axii 18,19 and the axis 18 is 90° relative to axis 19 in the same imaginary plane.

A manual centering system 20 is positioned within arm 16 and includes a glass mirror 21. The mirror 21 is flat with an F.5 focal distance and is disk-like (rounded), i.e., shaped like a flat coin. The mirror 21 is mounted on metal bracket 22 and has a highly reflective front surface. The mirror is "superflat", i.e., flat to one-quarter fringe. The bracket is mounted on a gimbal-like arrangement 23 which permits the mirror 21 to be turned in all directions about its center, i.e., turned about two axii which are perpendicular to each other (imaginary x and y axii).

Figure 2:
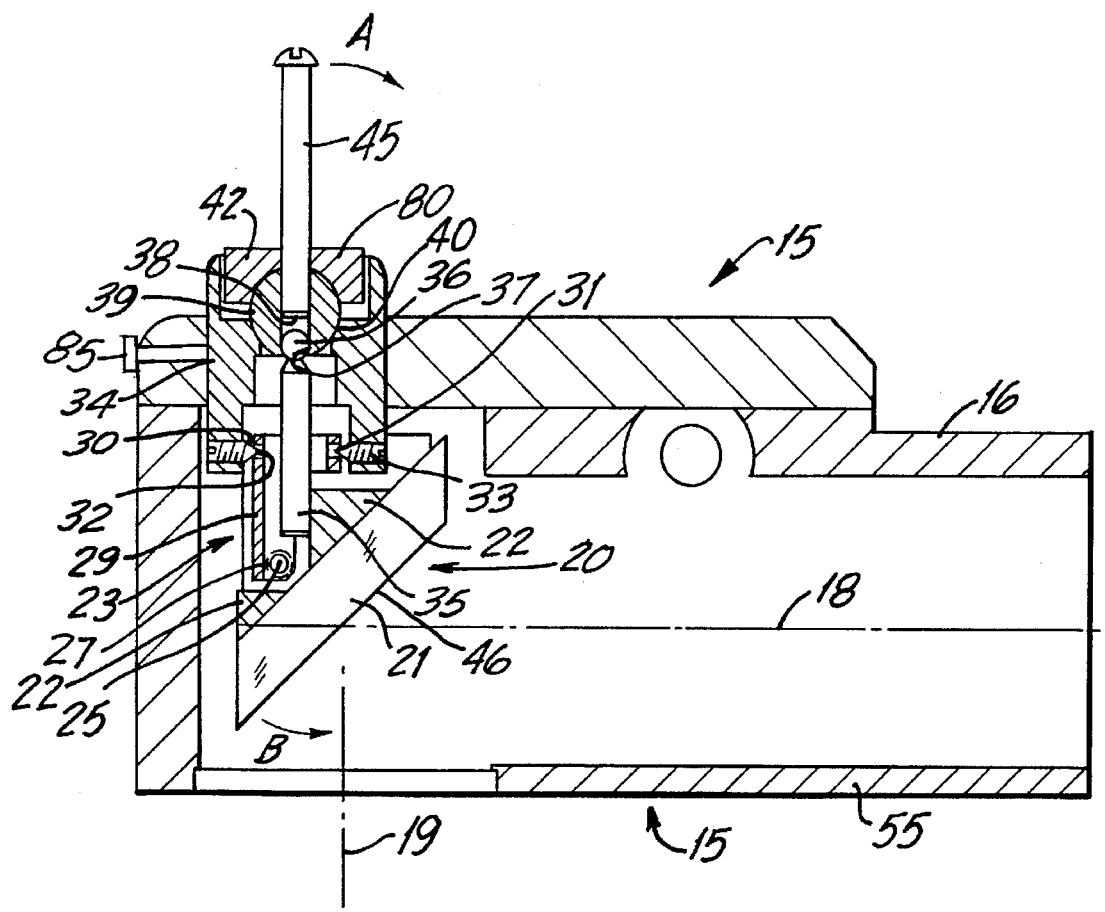

The bracket 22 is rotatably mounted by its two opposite extending shaft-like arms 25 which are rotatably mounted in round holes 27 of the link member 29, as shown in FIG. 2.

As shown in FIG. 2 the bracket 22 may be turned clockwise or counterclockwise about the center of arms 25. The link member 29 is tubular and has two opposite holes 30,31 which enclose the ends of pins 32,33 respectively. The pins 32,33 are fixed in tubular mounting member 34 which is held in the housing 16 by the adjustment screws 85. The link member 29 is rotatable about the pins 32,33.

An extension shaft 35 has its inner end (proximal end) fixed to the bracket 22. A small ball 36 is formed at the outer end (distal end) of the extension shaft 35 and fits within a partial spherical seat 37 formed on the inner wall of the bore 38 of a larger ball 39. The ball 39 is contained in a partial spherical seat 40 of the mounting member 34 and the partial spherical seat 81 of mounting ring 80, which is movable within the mounting member 34. A control rod 45 has its proximal end exposed outside of housing 16 so that it may be operated by the fingers of the user. The distal end of the control rod is fixed to the ball 39 within the bore 38 of the ball 39.

Figure 3:
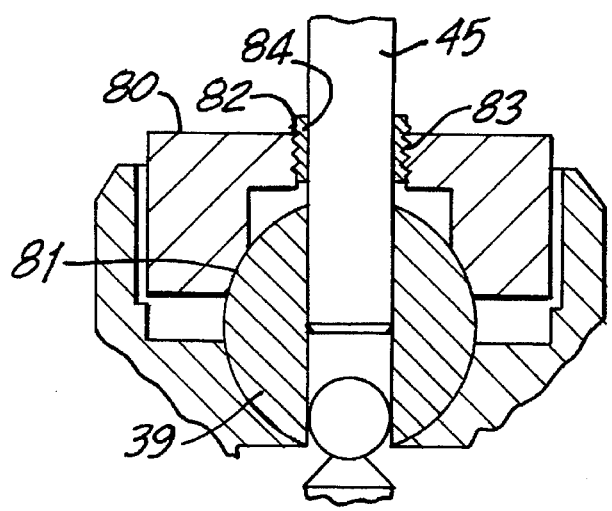
FIG. 3 is an enlarged cross-sectional view of the rod centering system.

A centering ring 80, as shown in FIG. 3, is used to automatically return the control rod 45 to its center, thereby also returning the mirror to its center position. The ring 80 has a curved (partial spherical) inside face 81 which acts against the larger ball 39. Ring 80 has internal screw threads 82 which mate with screw threads 83 on a ring 84 fixed to control rod 45. Before control rod 45 is to be operated, the centering ring 80 is unscrewed from ring 84 and is slid upwards (in FIG. 3) on rod 45. The control rod 45 is moved by the operator's fingers to its selected position and stays in its selected position because of friction. To return the control rod 45 to center, the ring 80 is pushed down and screwed onto the ring 84, which centers rod 45.

In operation, for example, when the proximal end of the control rod 45 is moved clockwise in the direction of arrow A in FIG. 2, the top of the larger ball 39, as seen in FIG. 2, is moved clockwise about its center. The bottom of the larger ball 39 moves clockwise causing the smaller ball 36 to move to the left. The distal end of the extension shaft 35 moves counterclockwise as the bracket 22 and mirror 21 are turned counterclockwise about the pivot point of shaft center 25, in the direction of arrow B. In this way the movement of the control rod 45 results in an opposite, but equal, movement of the mirror 21. The equal movement is obtained by having the length from the free tip of the control rod 45 to the center of larger ball 39 be equal to the length from the center of the smaller ball 37 to the pivot point 25.

The movements of the control rod, in any direction, result in the opposite movements of the mirror 21 about its center 26.

The image on the mirror, which is the image of the object being viewed by the microscope, may be turned in any direction, so that any portion of that image may be directed to any portion of the image plane of the camera.

The other manual control system used to focus the image, is shown in FIG. 1. A knob (not shown in FIG. 1) outside of the housing 16 is fixed to the shaft 51 which carries a pinion gear 52. The pinion gear 52 is in mesh with gear rack teeth 53 of tubular lens holder 54. The lens holder 54 is slidable within the tubular housing portion 55. A compound convex-convex lens 56 is held within the lens holder 54. The focal length selected for lens 56 depends upon the use of the microscope and, preferably, is 100 mm for eye surgery, 150 mm for nose and throat surgery and 140 mm for neurosurgery. When the knob 50 and its pinion gear 52 are rotated the lens holder 54 and its lens 56 are moved to the left, or right, as seen in FIG. 1, in order to focus the image.

The microscope mount includes a ring 60 having a tubular nose portion 61 which is attached to housing portion 55 so that nose portion 61 fits within a viewing port of the microscope. An attachment ring 70 having internal screw threads 71 and a fixing screw is connected to housing portion 55 and is used to mount the television camera. The ring 70 accepts conventional camera mount systems including "C" and bayonet types.

The microscope is provided with a manually operated iris 75 which is independently controlled. The iris 75 is a conventional overlapping leaf iris aperture control. Iris 75 has a ring which is rotatable by a lever 86 to open, or close, the aperture.

Modifications may be made in the above-described embodiment within the scope of the sub-joined claims. For example, the adapter may be operated from a remote controller by a suitable motor system connected to the control rod and the motor system controlled from a remote controller, such as a remote joy stick. The focus may also be remote controlled by connecting the pinion shaft to a two-way motor which is controlled from a remote controller.

What is claimed is:

1. An adapter adapted to be positioned between a television camera having an image plane with a center, and a microscope producing an image, the adapter transmitting an image of an object being viewed by the microscope to the television camera, the adapter comprising:

(a) a housing;

(b) means within the housing to focus the image including a focus control means, a lens holder movable within the housing, a lens mounted within the lens holder, a linkage means connecting the focus control means to the lens holder to move the lens holder and thereby focus the image; and (c) a mirror mounted within the housing, mirror mounting means to mount the mirror for swinging motion about two imaginary perpendicular axii and mirror control means to move the mirror to reflect a selected portion of the image on the center of the camera's image plane;

wherein the mirror mounting means includes a bracket fixed to the mirror, first means to freely rotatably mount the mirror about a first axis, and second means to freely rotatably mount the first means about a second axis which is perpendicular to the first axis.

2. An adapter adapted to be positioned between a television camera having an image plane with a center, and a microscope producing an image, the adapter transmitting an image of an object being viewed by the microscope to the television camera, the adapter comprising:

(a) a housing;

(b) means within the housing to focus the image including a focus control means a lens holder movable within the housing, a lens mounted within the lens holder, a linkage means connecting the focus control means to the lens holder to move the lens holder and thereby focus the image; and (c) a mirror mounted within the housing mirror mounting means to mount the mirror for swinging motion about two imaginary perpendicular axii and mirror control means to move the mirror to reflect a selected portion of the image on the center of the camera's image plane; wherein the mirror control means includes a control rod extending outside of the housing and adapted to be finger-operated.

3. An adapter as in claim 2 wherein the mirror control means includes a ball fixed to the control rod.

4. An adapter as in claim 3 wherein the mirror control means further includes a bore, within the ball, a second ball rotatably mounted within the bore, an extension rod fixed to the second ball, and a bracket fixed to the mirror, wherein the extension rod is fixed to the bracket.

5. An adapter as in claim 3 and further including a ring having a partial spherical face and means to removably connect the ring to the housing, in order to center the control rod, the control rod protruding through the ring.

6. An adapter as in claim 2 and having two opposite ends and having means to mount the television camera at one end of the adapter and means to mount a microscope at the opposite end of the adapter.

7. An adapter as in claim 2 and an aperture control iris having hand-operated control means, the iris being mounted in the housing between the microscope and the focus means.

8. An adapter adapted to be positioned between a television camera having an image plane with a center, and a microscope producing an image, the adapter transmitting an image of an object being viewed by the microscope to the television camera, the adapter comprising:

(a) a housing;

(b) means within the housing to focus the image including a focus control means, a lens holder movable within the housing, a lens mounted within the lens holder, a linkage means connecting the focus control means to the lens holder to move the lens holder and thereby focus the image;

(c) a mirror mounted within the housing, mirror mounting means to mount the mirror for swinging motion about two imaginary perpendicular axii and mirror control means to move the mirror to reflect a selected portion of the image on the center of the camera's image plane; and (d) mirror return means to operate the mirror control means to automatically return the mirror to a centered normal position.

9. An adapter as in claim 8 wherein the focus control means includes a finger-operated means extending outside of the housing.

10. An adapter as in claim 6 wherein the control means includes a centering ring about the control rod.

11. An adapter as in claim 8 wherein the mirror is a flat disk-like mirror having a center.

12. An adapter as in claim 8 wherein the mirror, in its normal position, reflects the image at a 45 degree angle.

13. An adapter as in claim 8 wherein the mirror mounting means includes a bracket fixed to the mirror, first means to freely rotatably mount the mirror about a first axis, and second means to freely rotatably mount the first means about a second axis which is perpendicular to the first axis.

14. An adapter as in claim 8 wherein the mirror control means includes a control rod extending outside of the housing and adapted to be finger-operated.

15. An adapter as in claim 14 wherein the mirror control means includes a ball fixed to the control rod and the mirror return means includes a centering ring about the control rod.

16. An adapter as in claim 14 wherein the mirror control means further includes a bore within the ball, a second ball rotatably mounted within the bore, an extension rod fixed to the second ball, an bracket fixed to the mirror, wherein the extension rod is fixed to the bracket.

17. An adapter as in claim 14 and the mirror return means including a centering ring and means to removably connect the ring to the housing, the control rod protruding through the ring.

18. An adapter as in claim 8 and having two opposite ends and having means to mount the television camera at one end of the adapter and means to mount a microscope at the opposite end of the adapter.

19. An adapter as in claim 8 and an aperture control iris having hand-operated control means, the iris being mounted in the housing between the microscope and the focus means.

20. An adapter adapted to be positioned between a television camera having an image plane with a center, and a microscope producing an image, the adapter transmitting an image of an object being viewed by the microscope to the television camera, the adapter comprising:

(a) a housing;

(b) means within the housing to focus the image including a focus control means, a lens holder movable within the housing, a lens mounted within the lens holder, a linkage means connecting the focus control means to the lens holder to move the lens holder and thereby focus the image; and (c) a reflector mounted within the housing, reflector mounting means to mount the reflector for swinging motion about two imaginary perpendicular axii and reflector control means to move the reflector to reflect a selected portion of the image on the center of the camera's image plane;

wherein the reflector control means includes a control rod extending outside of the housing and adapted to be finger-operated.

21. An adapter adapted to be positioned between a television camera having an image plane with a center, and a microscope producing an image, the adapter transmitting an image of an object being viewed by the microscope to the television camera, the adapter comprising:

(a) a housing;

(b) means within the housing to focus the image including a focus control means, a lens holder movable within the housing, a lens mounted within the lens holder, a linkage means connecting the focus control means to the lens holder to move the lens holder and thereby focus the image;

(c) a reflector mounted within the housing, reflector mounting mean to mount the reflector for swinging motion about two imaginary reflectors to reflect a selected portion of the image on the center of the camera's image plane; and (d) reflector return means to operate the reflector control means to automatically return the mirror to a centered normal position.

* * * * *